R. H. MADSEN.
LAWN MOWER GRINDER.
APPLICATION FILED AUG. 19, 1918.

1,291,982.

Patented Jan. 21, 1919.
3 SHEETS—SHEET 1.

WITNESS:

INVENTOR.
Rasmus H. Madsen.

BY Hazard & Miller
ATTORNEYS.

R. H. MADSEN.
LAWN MOWER GRINDER.
APPLICATION FILED AUG. 19, 1918.
1,291,982.
Patented Jan. 21, 1919.
3 SHEETS—SHEET 2.
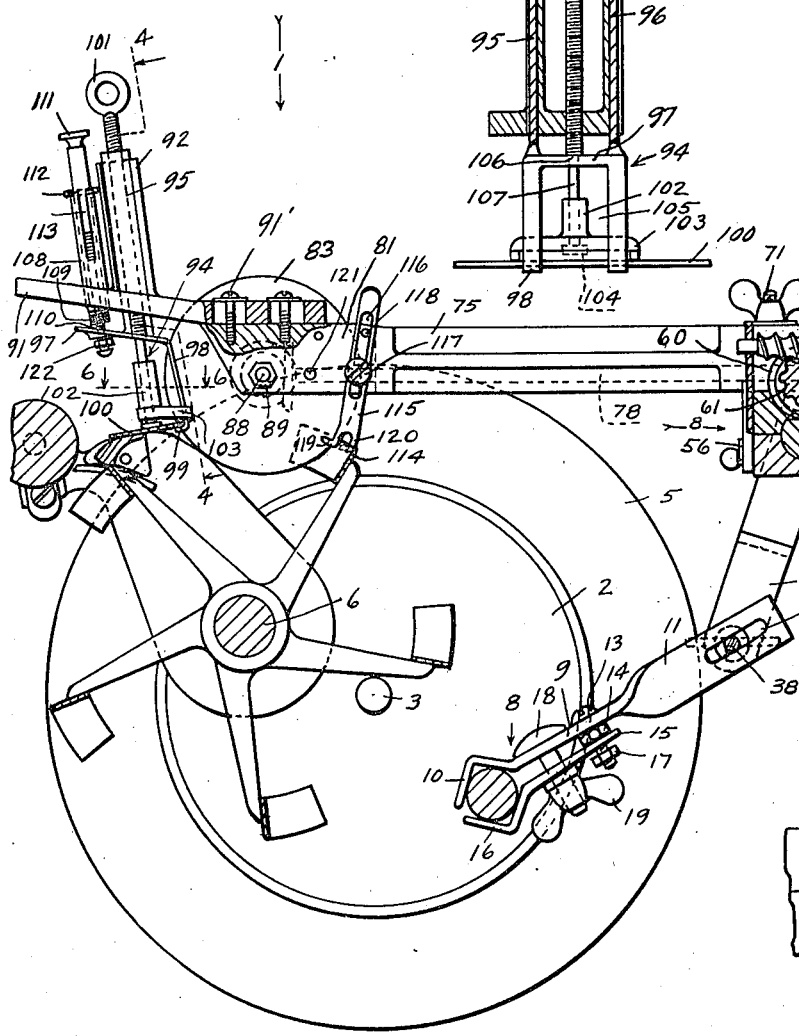
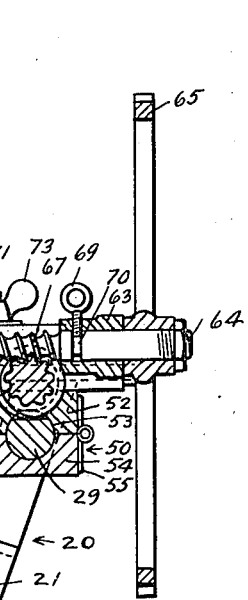
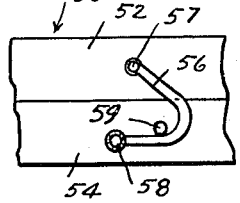
WITNESS:
INVENTOR.
Rasmus H. Madsen,
BY Hazard & Miller
ATTORNEYS.

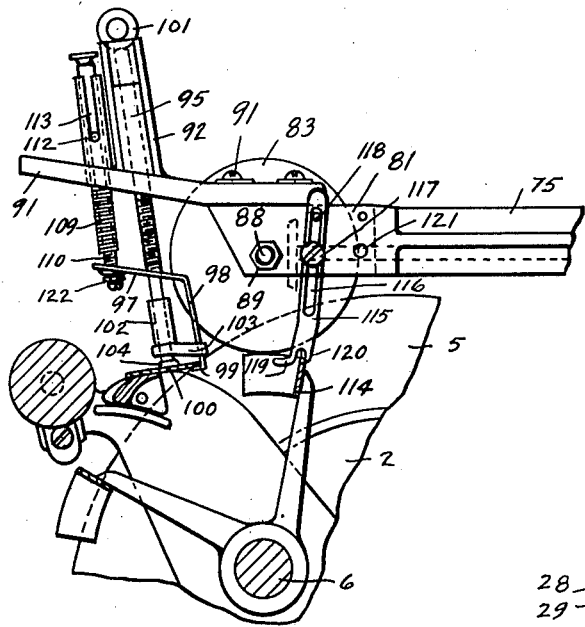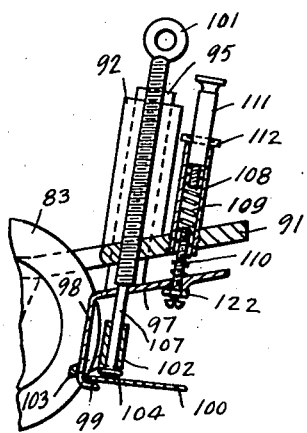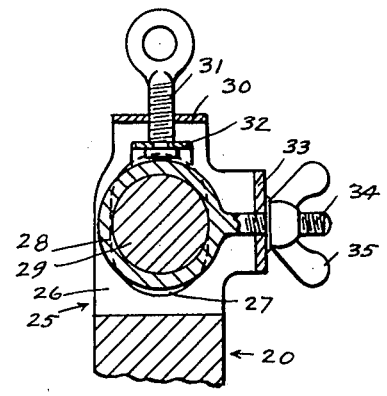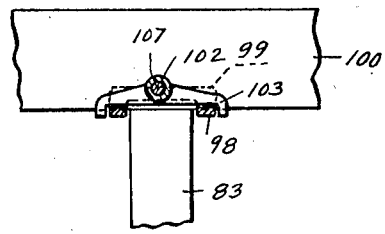

UNITED STATES PATENT OFFICE.

RASMUS H. MADSEN, OF LOS ANGELES, CALIFORNIA.

LAWN-MOWER GRINDER.

1,291,982.

Specification of Letters Patent.

Patented Jan. 21, 1919.

Application filed August 19, 1918. Serial No. 250,583.

*To all whom it may concern:*

Be it known that I, RASMUS H. MADSEN, a citizen of the United States, residing at Los Angeles, in the county of Los Angeles and State of California, have invented new and useful Improvements in Lawn-Mower Grinders, of which the following is a specification.

My invention relates to a lawn mower grinder, and consists of the novel features herein shown, described and claimed.

Fig. 2 is a vertical sectional detail crosswise of the axis of the lawn mower, and taken on the line 2—2 of Fig. 1, and looking in the direction indicated by the arrow, and showing the operation of grinding the rigid cutter bar of the lawn mower.

Fig. 3 is a fragmentary view analogous to Fig. 2, and showing the operation of grinding the revolving cutter blades.

Fig. 4 is a sectional detail on the line 4—4 of Fig. 2.

Fig. 5 is a sectional detail on the line 5—5 of Fig. 1.

Fig. 6 is a fragmentary sectional detail on the line 6—6 of Fig. 2.

Fig. 7 is a fragmentary sectional detail on the line 7—7 of Fig. 1.

Fig. 8 is a fragmentary elevation as indicated by the arrows 8 in Figs. 1 and 2.

Figure 1:
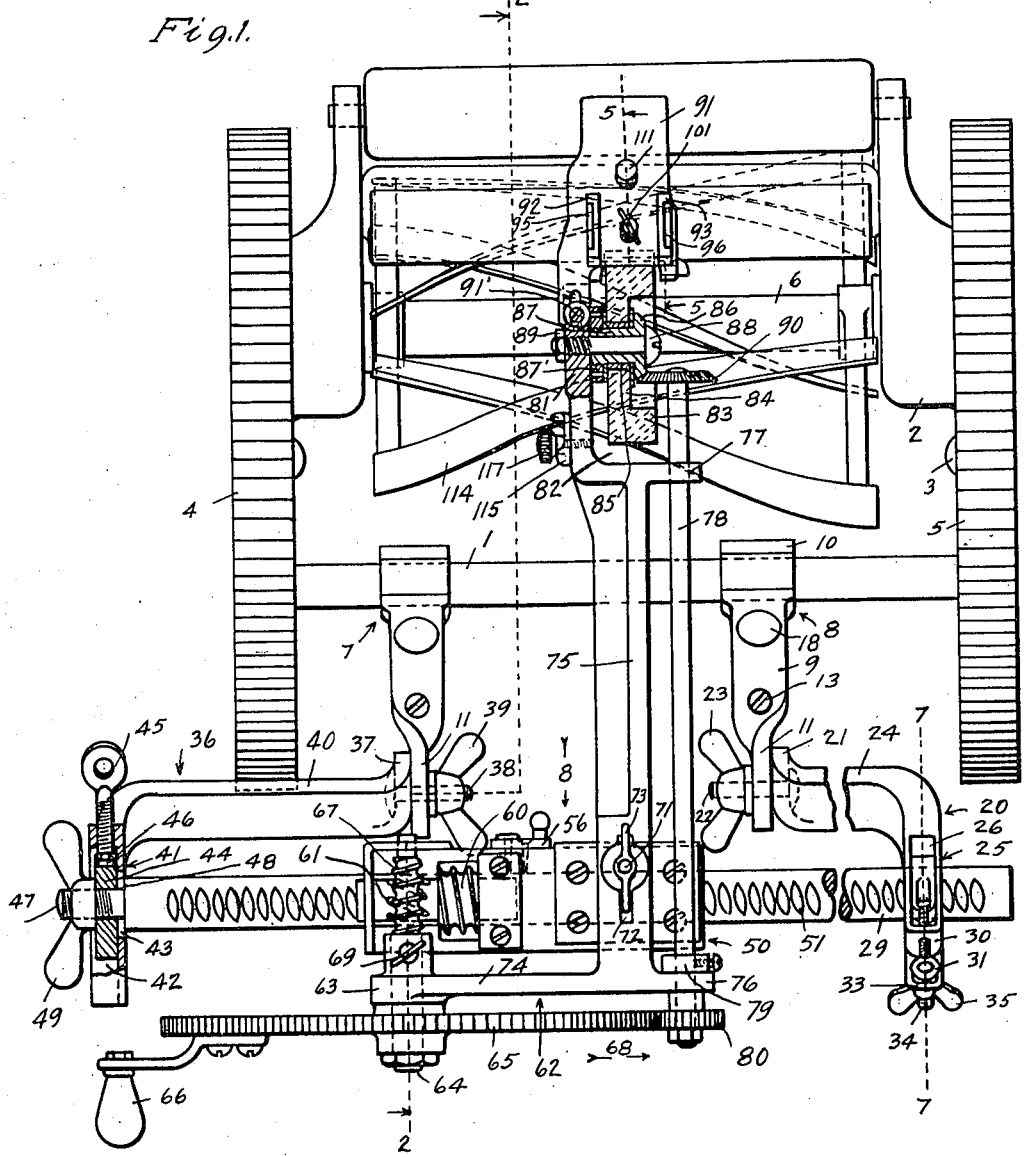
Figure 1 is a top plan view showing a lawn mower bottom side up with my lawn mower grinder applied to the lawn mower ready for use, parts being broken away and shown in section, and the view being taken looking in the direction indicated by the arrow 1 in Fig. 2.

The main brace rod 1 of a lawn mower frame has a rigid plate 2 at each end, and the axle spindles 3 are fixed in the plates 2 and extend outwardly through the wheels 4 and 5. Usually the main brace rod 1 is substantially diametrically opposite the axle spindles 3 from the revolving shaft 6. My lawn mower grinder is adapted to be attached to the main brace 1 by clamps 7 and 8. The clamps 7 and 8 are substantially alike, and each clamp is constructed as shown in Fig. 2. A bar of strap iron is cut to the desired length to form the intermediate portion 9, the clamping jaw 10 extending from one end of the intermediate portion 9, and an arm 11 extending from the other end of the intermediate portion 9, the arm 11 being twisted a quarter turn so the flat sides of the arm 11 are vertical while the flat sides of the intermediate portion 9 are horizontal, and a longitudinal extending slot 12 is formed through the arm 11. A screw 13 is inserted downwardly through the intermediate portion 9, and a nut 14 is placed upon the screw 13 against the lower face of the intermediate portion 9. A second piece of strap iron is cut to the desired length to form the lever 15 and the clamping jaw 16. The lever 15 has an opening through the opposite end from the jaw 16 to receive the screw 13, and a nut 17 is placed upon the screw to hold the lever 15 in place. A clamping screw 18 is inserted downwardly through the intermediate portion 9 and through the center of the lever 15, and a wing nut 19 is placed upon the clamping screw 18 against the lever 15, so that by tightening the wing nut 19 one end of the lever 15 is pressed against the nut 14, and the jaws 10 and 16 are tightened upon the main brace 1.

An extension arm 20 has a flat portion 21 fitting against the side of the arm 11. A bolt 22 is inserted through the portion 21 and through the slot 12 in the arm 11, and a wing nut 23 is applied, so that when the nut 23 is loosened the extension arm 20 may be adjusted to any desired angle relative to the clamp 8, and the bolt 22 may be moved forwardly or backwardly in the slot 12, and then the nut 23 tightened. The extension arm 20 has a spacing portion 24 extending parallel with the main brace rod 1 past the wheel 5, and a bearing portion 25 extending outwardly and upwardly at right angles to the spacing portion 24. The bearing 25 has a slot 26 extending in a plane crosswise of the main brace 1, and openings 27 extending transversely of the slot 26, and parallel with the main brace 1. A gripping bearing block 28 is mounted in the slot 26, and the feed bar 29 extends through the gripping bearing block 28 and loosely through the openings 27. A plate 30 extends across the upper end of the slot 26; an adjusting screw 31 is screw seated through the plate 30, and connected to the gripping bearing block 28 by a swivel construction 32, so that by manipulating the adjusting screw 31 the feed bar 29 may be raised or lowered to the limits of the openings 27. A plate 33 extends across the slot 26 at right angles to the plate 30. A screw threaded stem 34 extends from the gripping bearing block 28 through the plate 33, and a wing nut 35 is mounted upon the outer end of the stem 34 against the plate 33, so that when the wing nut 35 is loosened the adjusting screw 31 may be operated, and when the feed bar has been properly located the wing nut 35 may be tightened to grip the feed bar 29 against the sides of the openings 27, and hold the feed bar rigidly in place.

A second extension arm 36 has a flat portion 37 fitting against the arm 11 of the clamp 7. A bolt 38 is inserted through the portion 37 and through the slot 12 in the arm 11, and a wing nut 39 is applied to connect the extension arm 36 to the clamp 7, in the same manner as the extension arm 20 is connected to the clamp 8. The extension arm 36 has a spacing portion 40 extending laterally outside of the wheel 4, and the bearing 41 extending from the outer end of the spacing portion 40 parallel with the bearing 25. The bearing 41 has a recess 42 extending from its outer face and a slotted opening 43 at the center of the recess 42. A bearing block 44 fits loosely in the recess 42. An adjusting screw 45 is screw seated through the bearing 41, and connected to the bearing block 44 by a swivel construction 46. The end of the feed bar 29 is reduced to form the screw 47 and the shoulder 48, and the feed bar is inserted with the screw 47 extending through the slot 43, and through the bearing block 44 and the shoulder 48 engaging the inner face of the bearing 41, and a wing nut 49 is applied to the outer end of the screw, so that the wing nut may be loosened, the adjusting screw 45 manipulated to line up the screw 47 with the gripping bearing block 28, and then the wing nut 49 may be tightened to hold the feed bar 29 firmly in place.

A carriage 50 is slidingly mounted on the feed bar 29. The feed bar 29 is circular, and a gear rack 51 is formed upon the feed bar. The carriage 50 has a block 52 with a groove 53 in its lower face, said groove 53 forming a half bearing fitting downwardly upon the feed bar 29. A second block 54 forms the other half of the bearing, and the block 54 is connected to the block 52 by hinges 55. A latch 56 is pivotally connected to the rear face of the block 52 by a pin 57, and a handle 58 is fixed upon the free end of the latch 56. A pin 59 is fixed in the front face of the block 54, so that when the handle 58 is manually operated the latch 56 may be swung to hold the block 54 rigid with the block 52 with the feed bar 29 in the bearing thus formed.

A driving worm 60 is mounted in the carriage by being recessed into the upper face of the block 52, and the thread upon the driving worm meshes with the rack 51. A worm gear 61 is formed integral with the driving worm 60. A supporting frame 62 is mounted upon the carriage block 52 and has a bearing 63 in which the drive shaft 64 is mounted. A spur gear 65 is fixed upon the front end of the drive shaft 64, and a hand crank 66 is fixed to the spur gear. A driving worm 67 is formed upon the rear end of the drive shaft 64 in mesh with the worm gear 61, so that when the hand crank 66 is manually operated clockwise the carriage 50 will move in the direction indicated by the arrow 68, and when it is desired to return the carriage to the left to start a new grinding operation the latch 56 is operated to release the carriage from the feed bar 29, so that the driving worm 60 may be raised out of mesh with the rack 51, and the carriage moved bodily to the left. Of course, the carriage may be fed to the left by reversing the operation of the hand crank, but this would be a slow process. The drive shaft 64 is held removably in place in the bearing 63 by a screw 69 screw seated downwardly through the bearing with the point of the screw operating in the groove 70 in the shaft, so that when the screw 69 is screwed out the shaft may be removed. The frame 62 is adjustably mounted upon the carriage 50 by a set screw 71 extending through a slot 72 in the frame 62 and fixed in the block 52, there being a wing nut 73 upon the screw, so that by loosening the wing nut 73 the frame 62 may be moved forwardly or backwardly to the limits of the slot 72, and then by tightening the wing nut 73 the frame is held rigidly upon the carriage 50.

The frame 62 has a transversely extending bar 74 and a longitudinally extending bar 75. The slot 72 is formed through the bar 75, the bar 74 being in front of the carriage 50, and the bar 75 extending over the carriage 50. Bearings 76 and 77 extend laterally from the bar 75, and the transmission shaft 78 is mounted in the bearings 76 and 77. A set collar 79 is mounted upon the transmission shaft 78 against the bearing 76. A spur pinion 80 is fixed upon the forward end of the shaft 78 in mesh with the large spur gear 65, so that when the hand crank 66 is operated the shaft 78 will be rotated at a high speed.

A bearing plate 81 extends from the rear end of the bar 75 in a plane parallel with the bar 75, said bearing plate being offset so as to form a recess 82 in line with the bar 75. A grinding wheel 83 of hard material, such as emery or carborundum, is mounted to operate in the recess 82, and has a dished side face 84 and a central bushing 85. A bevel pinion 86 is mounted in the dished face 84 of the grinding wheel 83, and has a sleeve 87 extending through and fitting tightly in the bushing 85. A nut 87' is screwed upon the sleeve 87 against the straight side of the grinding wheel 83 to clamp the bevel pinion 86 to the grinding wheel. A bolt 88 is inserted through the bevel pinion 86 and through the sleeve 87, and tapped through the arm 75, and a jam nut 89 is applied to the bolt so the bolt may be adjusted to allow the bevel pinion 86 to run freely, and then set by the jam nut. A bevel gear 90 is fixed upon the transmission shaft 78 in mesh with the bevel pinion 86, so that when the hand crank 66 is operated the grinding wheel 83 will be rotated at a high speed.

A supporting plate 91 extends backwardly from the bearing plate 81 in line with the grinding wheel 83. The supporting plate 91 is formed separately from the bearing plate 81 and is adjustably connected to the bearing plate 81 by bolts 91' inserted through slots in the plate 91 and tapped into the bearing plate 81, so that the plate 91 may be adjusted toward the grinding wheel 83 as the wheel wears away, and adjusted away from the wheel when a new wheel is inserted. Slide-ways 92 and 93 extend upwardly from the supporting plate 91. The adjusting frame 94 has slides 95 and 96 fitting in the slide-ways 92 and 93, there being a cross head 97 connecting the slides 95 and 96 below the supporting plate 91. An arm 98 extends downwardly from the front side of the cross head 97, and a finger 99 extends backwardly from the lower end of the arm 98 to engage under the rigid cutter bar 100 of the lawn mower. An adjusting screw 101 is screw seated through the supporting plate 91 between the slide-ways 92 and 93, and is swiveled through the cross head 97. A bearing sleeve 102 is swiveled upon the lower end of the screw 101, and a guide bar 103 is fixed upon the bearing sleeve 102 parallel with the finger 99, said guide bar 103 fitting on top of the fixed cutter bar 100. The guide bar 103 extends laterally both ways from the bearing sleeve 102, and the ends of the guide bar 103 are slidingly connected to the arm 98. A foot 104 is fixed to the lower end of the screw 101, and adapted to engage on top of the fixed cutter 100, so that the grinding wheel 83 will move along the edge of the fixed cutter bar 100 as the hand crank 66 is operated. The parts are adjusted so that the finger 99 will slide under the edge of the cutter bar 100, and the foot 104 will slide on top of the cutter bar 100, and a slot 105 is formed through the arm 98, so that the edge of the grinder 83 will extend through the slot 105 and grind the edge of the fixed cutter bar 100 as the grinder moves laterally along the edge. The shoulder 106 upon the lower end of the adjusting screw 101 engages the cross head 97 to limit the upward movement of the finger 99, and there is a smooth place 107 upon the adjusting screw 101 below the shoulder 106 and above the sleeve 102, so that the cross head 97 may slide down to the sleeve 102. A spring casing 108 extends upwardly from the supporting plate 91 a short distance behind the adjusting screw 101. A coil spring 109 is slidingly mounted in the casing 108. A screw 110 is inserted upwardly through the cross head 97 and screwed into the end of the spring 109. A handle 111 fits slidingly in the upper end of the casing 108 and is screwed into the upper end of the spring 109. A cross head 112 is fixed through the handle 111, and the casing 108 has vertical diametrically opposed slots 113, so that when the handle 111 is operated and pulled upwardly as in Fig. 5, and the cross head 112 turned to engage the upper end of the casing 108 the finger 99 will be raised until the cross head 97 strikes the shoulder 106 of the adjusting screw 101, and the finger may be accurately located by manipulating the adjusting screw 101, so as to overcome the tension of the spring 109. Then if the handle 111 is manipulated to turn the cross head 112 into the slots 113, and the adjusting screw 101 manipulated to lower the cross head 97, the grinder 83 may be raised into position to grind a rotary blade 114, as shown in Fig. 3. During the operation of grinding the fixed cutter bar 100 or the rotary blades 114 the grinder is supported upon the fixed cutter bar, as shown in Fig. 2 for grinding the fixed cutter bar 100, and as shown in Fig. 3 for grinding a rotary blade 114.

An adjustable guide plate 115 has a long slot 116, and the guide plate fits against the side of the bearing plate 81 and is secured adjustably in place by a screw 117 inserted through the slot 116, and tapped into the bearing plate. A pin 118 is fixed in the bearing plate 81 to extend into the slot 116, or alongside of the plate 115 to hold the plate from turning on the screw 117. Fingers 119 and 120 extend downwardly from the guide plate 115 and straddle the rotary blade 114, so that as the grinder wheel 83 moves along the edge of the fixed cutter bar 100 the blades 114 will be moved out of contact with the grinder wheel as shown in Fig. 2, and so that when the grinder wheel has been adjusted to grind the rotary blade 114 the fingers 119 and 120 will hold the blade 114 in proper position for the operation of the grinder wheel as shown in Fig. 3. Of course, the plate 115 will be adjusted differently to fit different lawn mowers, and for the two different operations and for the purpose of these different adjustments a plurality of tapped holes 121, and a plurality of fixed pins 118 may be provided, so that the adjusting blade 115 may be moved from one pin 118 to another, and the screw 117 may be moved from one hole 121 to another.

An adjusting nut 122 is mounted upon the screw 110 below the cross head 97, so that by manipulating the nut the tension of the spring 109 may be regulated.

Thus I have produced a lawn mower grinder comprising a universally adjustable supporting frame adapted to be clamped to the lawn mower; a feed bar adjustably mounted in the supporting frame; a carriage mounted to travel on the feed bar; a second frame supported upon the carriage; a slide carried by the second frame and adapted to engage the rigid cutter bar of the lawn mower; a grinder wheel mounted in the second frame; means for adjusting the grinder wheel to grind the cutting edge of the fixed cutter bar; means for adjusting the grinder wheel to grind the cutting edge of the rotary blade, and means for feeding the carriage upon the feed bar, and driving the grinder wheel.

Special attention is called to the fact that after the lawn mower grinder has been properly applied to the lawn mower, the rigid cutter bar and the rotary blades may be ground, simply by adjusting the grinder wheel from one position to another, and that the lawn mower grinder is complete in itself and may be readily adjusted and attached to any lawn mower.

Various changes may be made without departing from the spirit of my invention as claimed.

I claim:

1. A lawn mower grinder comprising, a universally adjustable supporting frame adapted to be clamped to a lawn mower; a feed bar adjustably mounted in the supporting frame; a carriage mounted to travel on the feed bar; a second frame supported upon the carriage; a slide carried by the second frame and adapted to engage the rigid cutter bar of a lawn mower; a grinder wheel mounted in the second frame; means for adjusting the grinder wheel to grind the cutting edge of the fixed cutter bar; means for adjusting the grinder wheel to grind the cutting edges of the rotary blades; means for feeding the carriage upon the feed bar; and means for operating the grinder wheel.

2. In a lawn mower grinder, a grinder wheel; means for connecting the grinder wheel to a lawn mower frame so that the grinder wheel will travel in a plane parallel with the axis of the lawn mower; means for operating the grinder wheel; and means for adjusting the grinder wheel to grind the cutting edge of the fixed cutter bar of the lawn mower; said means comprising, a supporting plate, slideways extending upwardly from the supporting plate, slides fitting in the slideways, a cross head connecting the slides below the supporting plate, an arm extending downwardly from the front side of the cross head, a finger extending backwardly from the lower end of the arm to engage under the rigid cutter bar of the lawn mower, an adjusting screw extending through the supporting plate between the slides and swiveled through the cross head, a bearing sleeve swiveled upon the lower end of the adjusting screw, and a guide bar fixed upon the bearing sleeve parallel with the finger and adapted to fit on top of the fixed cutter bar of the lawn mower.

3. In a lawn mower grinder a grinder wheel operatively mounted to rotate and travel longitudinally of the axis of a lawn mower; and means for adjusting the grinder wheel to grind the cutting edges of the rotary blades of the lawn mower; said means comprising the combination with a frame carrying the grinder wheel, of an adjustable guide plate having a long slot and fitting against the side of the frame, a screw inserted through the slot and tapped into the frame, a pin fixed in the frame and extending into the slot to hold the guide plate from turning on the screw, and fingers extending downwardly from the guide plate and adapted to straddle the rotary blade of the lawn mower so as to hold the rotary blade in proper position for grinding relative to the grinder wheel as the grinder wheel moves from one end of the blade to the other.

In testimony whereof I have signed my name to this specification.

RASMUS H. MADSEN.